Nov. 6, 1928.                                              1,690,943
F. C. OWEN
VARIABLE VOLTAGE TRANSFORMER FOR ELECTRIC ARC
CUTTING AND WELDING APPARATUS
Filed Sept. 22, 1927        2 Sheets-Sheet 1
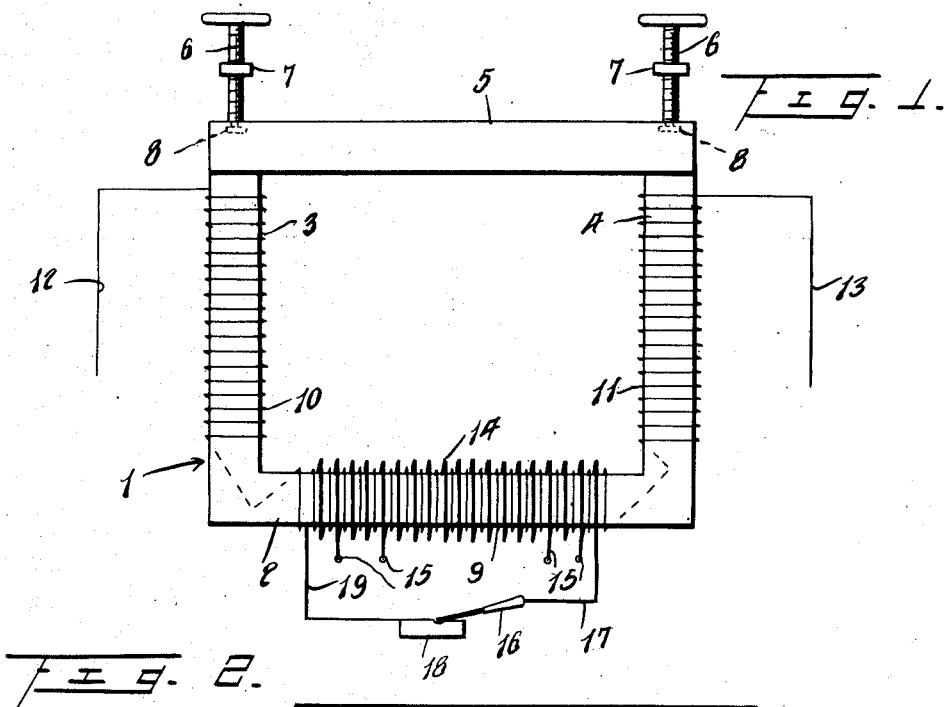
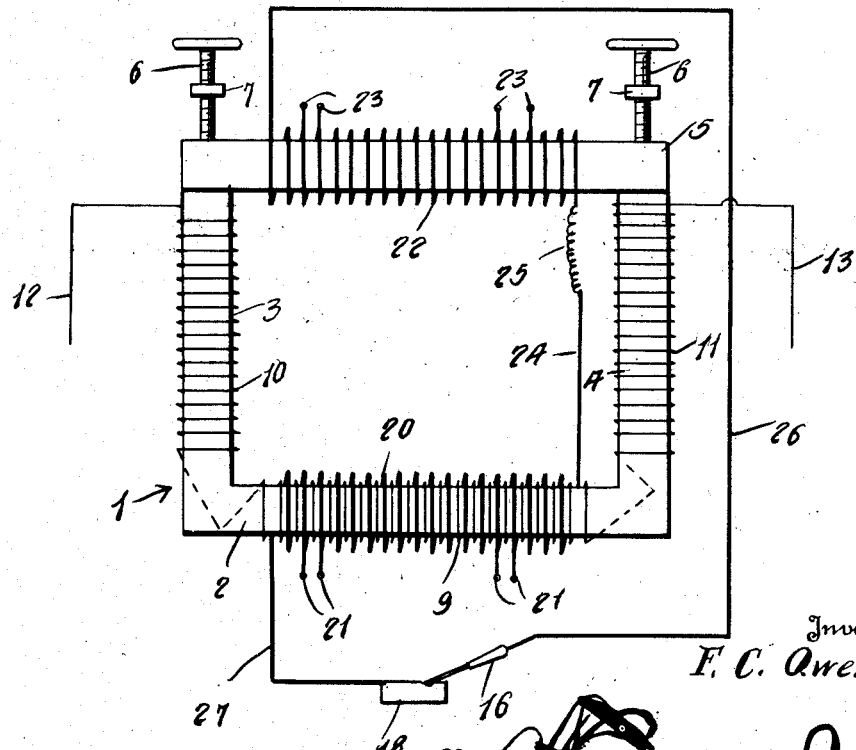
Inventor
F. C. Owen
Attorney Nov. 6, 1928.  1,690,943
F. C. OWEN
VARIABLE VOLTAGE TRANSFORMER FOR ELECTRIC ARC
CUTTING AND WELDING APPARATUS
Filed Sept. 22, 1927    2 Sheets-Sheet 2

Inventor
F. C. Owen.
By [signature]
Attorney

Patented Nov. 6, 1928.

1,690,943

UNITED STATES PATENT OFFICE.

FREDERICK C. OWEN, OF FAYETTEVILLE, NORTH CAROLINA.

VARIABLE-VOLTAGE TRANSFORMER FOR ELECTRIC-ARC CUTTING AND WELDING APPARATUS.

Application filed September 22, 1927. Serial No. 221,291.

This invention relates to improvements in alternating current electric arc cutting, repairing and welding apparatus, and more particularly to improvements in the transformer for such apparatus which constitutes the subject-matter of my U. S. Patent 1,619,753, granted March 1, 1927.

The present invention has for one of its objects to improve said transformer to the end that the cutting, repairing or welding voltage induced in its secondary winding may be easily and quickly varied without altering the number of ampere turns of the secondary winding included in the working circuit, and to attain this end comprehends the alteration of the core of the transformer in a manner to permit its reluctance to be varied at will.

Figure 3:
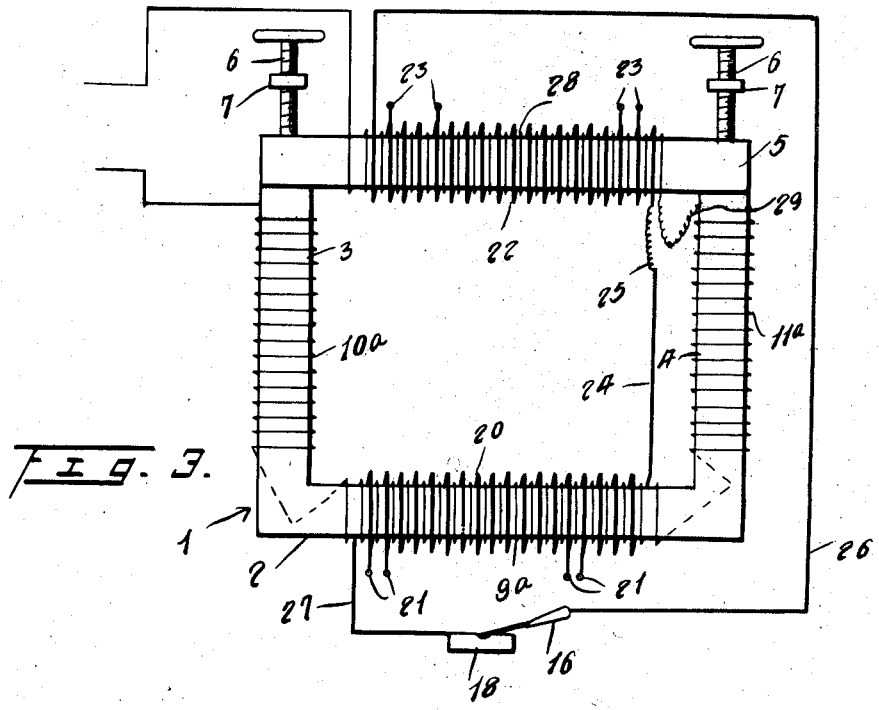
Figure 4:
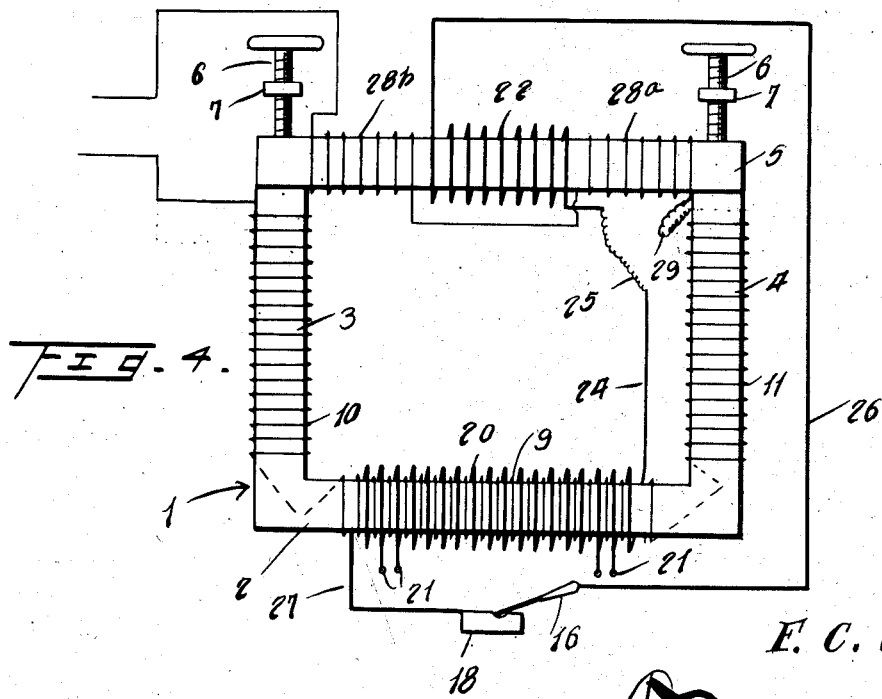

With the foregoing and other objects in view, the nature of which will appear as the description proceeds, the present invention consists of the construction, combination and arrangement of parts hereinafter fully described and claimed, and illustrated in the accompanying drawings, wherein:

Figure 1 is a diagrammatic view of an alternating current electric arc cutting, repairing and welding apparatus embodying a transformer constructed in accordance with the present invention, and Figures 2, 3 and 4 are similar views illustrating slightly modified forms of the transformer.

Referring in detail to the drawings, and more particularly to Figure 1, 1 designates a laminated core which is preferably of rectangular formation. The bottom leg 2 and the side legs 3 and 4 of the core 1 are connected together, and the top leg 5 of the core is adjustable vertically with respect to the upper or free terminals of the side legs. Screws 6 engaged with fixed supports 7 and swivelly connected as at 8 to the ends of the top leg 5, provide means through the medium of which this leg may be adjusted and which prevents it from chattering in any adjusted position thereof.

The primary winding of the transformer comprises connected coils 9, 10 and 11 which are arranged on the legs 2, 3 and 4. Leads 12 and 13 connected to the upper or free terminals of the coils 10 and 11, extend to the power circuit. The secondary winding of the transformer comprises a coil 14 arranged on the leg 2 and provided with taps 15.

A cutting, repairing or welding electrode 16 is connected by a lead 17 to one of the taps 15, and the work 18 to be cut, repaired or welded is connected by a lead 19 to another of the taps.

The core 1 provides a single magnetic path for the flux generated by current flowing through the primary winding, and this winding is distributed about the major portion of the magnetic path. This portion of the magnetic path consists of the legs 2, 3 and 4, and the remaining or minor portion of the path, which consists of the leg 5, is adjustable with respect thereto so as to permit the reluctance of the magnetic path to be varied. The adjusting of the minor portion away from the major portion increases the reluctance of the magnetic path, and the adjusting of the minor portion in the direction of the major portion decreases the reluctance of the magnetic path. It will thus be understood that the cutting, repairing or welding voltage induced in the secondary winding may be varied at will and easily and quickly without altering the number of the ampere turns of the secondary winding in the working circuit.

As shown in Figure 2, the secondary winding may consist of a main coil 20 arranged on the leg 2 and provided with taps 21, and an auxiliary coil 22 arranged on the leg 5 and provided with taps 23. These coils are connected by a lead 24 which is provided with a coiled portion 25 so as to permit the adjustment of the leg 5. The electrode 16 is connected to one of the taps 23 by a lead 26, and the work 18 is connected to one of the taps 21 by a lead 27. The remaining parts of this transformer are similar to the corresponding parts of the one shown in Figure 1.

In this transformer practically all the flux developed by the primary winding threads the main secondary coil 20, due to the fact that this winding and coil are arranged on the same or major portion of the core 1. Flux in this portion of the core remains substantially constant at all loads, with the result that the voltage generated in the main secondary coil 20 remains practically the same at all times and does not vary with the load. The auxiliary secondary coil 22 tends to develop a flux independent of and opposed to that generated by the primary winding. As the primary winding is distributed about the greater portion of the core 1, and as the auxiliary secondary coil 22 is arranged on the minor portion of the core, the flux generated by this coil is confined to the minor portion of the core by the flux generated by the primary winding. The reaction between these fluxes, which takes place at the upper ends of the legs 3 and 4 and which varies with the load, causes the auxiliary secondary coil 22 to develop high inductance and act as an impedance coil. It will thus be understood that a constant main voltage and a variable secondary voltage is induced in the secondary winding, and that the reaction between these voltages is such that there is induced in the secondary circuit a light current at light load and a heavy current at heavy load. The reluctance of the magnetic circuit, and consequently the reaction between the fluxes, may be varied by adjusting the minor portion of the magnetic path with respect to the major portion of such path, with the result that the desired cutting repairing or welding voltages induced in the secondary circuit may be varied at will and easily, and quickly without altering the number of ampere turns of the coils 20 and 22 in the working circuit.

The cores and the secondary windings of the transformers shown in Figures 3 and 4, are similar to the corresponding parts of the transformer shown in Figure 2 and are designated by the same reference characters. The primary windings of these transformers differ slightly from the corresponding winding of the transformer shown in Figure 2, in that they each consist of a main section and an auxiliary section. The main sections of these primary windings are similar and consist of coils 9ª, 10ª and 11ª arranged on the legs 2, 3 and 4 which constitute the major portions of the cores. The auxiliary section of the primary winding of the transformer shown in Figure 3 consists of the coil 28 arranged on the leg 5 or minor portion of the core and connected to the coil 11ª by a lead 29 which is coiled to permit the adjustment of the minor portion of the core with respect to the major portion thereof. The ampere turns of the auxiliary secondary coil 22 are mingled with the ampere turns of the auxiliary section 28 of the primary winding. The auxiliary section of the primary winding of the transformer shown in Figure 4 consists of coils 28ª and 28ᵇ connected and arranged in spaced relation on the leg 5 or minor portion of the core, the auxiliary secondary coil 22 of this transformer being mounted upon this portion of the core between the coils 28ª and 28ᵇ. The auxiliary sections of the primary windings and the auxiliary secondary coils of these transformers set up fluxes in the minor portion of the core. These fluxes oppose each other and are confined to the minor portion of the core by the fluxes generated by the main sections of the primary windings. The reaction between the fluxes generated in the major and minor portions of the cores of each of these transformers is such as to provide a constant main voltage and variable secondary voltages in the secondary winding, and the reaction between these voltages is such as induces in the secondary circuit a light current at light load and a heavy current at heavy load.

The transformers enable a stable arc of high power factor to be readily maintained during overhead, vertical and horizontal cutting, repairing or welding of steel, wrought iron, cast iron, malleable iron, aluminum, brass, bronze, copper and other alloy metals. Furthermore, the arc induced by these transformers is free from sputtering.

What is claimed is:—

1. A transformer comprising a core embodying relatively adjustable portions, a primary winding arranged on one of said portions, and a secondary winding arranged on both of said portions.

2. A transformer comprising a core embodying relatively adjustable portions, a primary winding arranged on both of said portions, and a secondary winding arranged on both of said portions.

3. A transformer comprising a core embodying relatively adjustable portions, a primary winding and a main secondary coil arranged on one of said portions, and an auxiliary secondary coil arranged on the other of said portions and connected to said main coil.

4. A transformer comprising a core embodying relatively adjustable major and minor portions, a primary winding distributed over the greater part of the major portion of the core, and a secondary winding embodying coils arranged on said portions of the core and connected together.

5. A transformer comprising a core providing a single magnetic path, a primary coil on a part of the core and adapted to cause substantially all the primary flux to traverse the other part of the core, said other part being relatively adjustable, a secondary coil on said other part of the core, and a second secondary coil connected to the first and arranged on that part of the core on which the primary coil is mounted.

6. A transformer having a core consisting of a rectangular frame providing a single magnetic path, a primary winding distributed around three adjacent legs of the frame, the remaining leg of the frame being adjustable, means for adjusting said leg of the frame, and a secondary winding comprising two sections of which one is mounted on the middle of said three legs and of which the other is arranged on the adjustable leg.

In testimony whereof I affix my signature.

FREDERICK C. OWEN.